US012724317B2

(12) United States Patent
Tanaka

(10) Patent No.: US 12,724,317 B2

(45) Date of Patent: Sep. 1, 2026

(54) OPTICAL MODULATOR AND METHOD OF MANUFACTURING AN OPTICAL MODULATOR

(71) Applicant: Sumitomo Electric Industries, Ltd., Osaka (JP)

(72) Inventor: Hajime Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 302 days.

(21) Appl. No.: 18/665,091

(22) Filed: May 15, 2024

(65) Prior Publication Data

US 2024/0419048 A1 Dec. 19, 2024

(30) Foreign Application Priority Data

Jun. 14, 2023 (JP) ................................ 2023-097537

(51) Int. Cl.
*G02F 1/225* (2006.01)
*G02F 1/21* (2006.01)

(52) U.S. Cl.
CPC .............. *G02F 1/225* (2013.01); *G02F 1/212* (2021.01)

(58) Field of Classification Search
CPC ................................ G02F 1/225; G02F 1/212
See application file for complete search history.

(56) References Cited

U.S. PATENT DOCUMENTS 9,069,223 B2 6/2015 Prosyk
11,353,728 B2 * 6/2022 Tanaka .................... G02F 1/015
2016/0357086 A1 * 12/2016 Jewart .................... G02B 6/125
2021/0055622 A1 2/2021 Tanaka et al.

FOREIGN PATENT DOCUMENTS

JP 2021-033042 A 3/2021

* cited by examiner

*Primary Examiner* — Sung H Pak

(74) *Attorney, Agent, or Firm* — Volpe Koenig

(57) ABSTRACT

An optical modulator includes a first Mach-Zehnder modulation portion including a first waveguide and a second waveguide, a second Mach-Zehnder modulation portion including a third waveguide and a fourth waveguide, a third Mach-Zehnder modulation portion optically coupled to the first Mach-Zehnder modulation portion and the second Mach-Zehnder modulation portion. The third Mach-Zehnder modulation portion includes a fifth waveguide including an input end optically coupled to an output end of the first waveguide, a sixth waveguide including an input end optically coupled to an output end of the second waveguide, a seventh waveguide including an input end optically coupled to an output end of the third waveguide, an eighth waveguide including an input end optically coupled to an output end of the fourth waveguide.

4 Claims, 5 Drawing Sheets

OPTICAL MODULATOR AND METHOD OF MANUFACTURING AN OPTICAL MODULATOR

CROSS REFERENCE TO RELATED APPLICATIONS

This application claims priority based on Japanese Patent Application No. 2023-097537 filed on Jun. 14, 2023, and the entire contents of the Japanese patent application are incorporated herein by reference.

TECHNICAL FIELD

The present disclosure relates to an optical modulator and a method of manufacturing an optical modulator.

BACKGROUND

Patent Literature 1 (Japanese Unexamined Patent Application Publication No. 2021-33042) discloses an optical modulator. The optical modulator includes a first Mach-Zehnder modulation portion and a second Mach-Zehnder modulation portion. The first Mach-Zehnder modulation portion includes a first waveguide and a second waveguide. The second Mach-Zehnder modulation portion includes a third waveguide and a fourth waveguide. Output ends of the first waveguide and the second waveguide are optically coupled to a fifth waveguide through an optical coupler. Output ends of the third waveguide and the fourth waveguide are optically coupled to a sixth waveguide through an optical coupler. Patent Literature 2 (U.S. Pat. No. 9,069,223) discloses a Mach-Zehnder optical modulator.

SUMMARY

An optical modulator according to an aspect of the present disclosure includes a first Mach-Zehnder modulation portion including a first waveguide and a second waveguide, a second Mach-Zehnder modulation portion including a third waveguide and a fourth waveguide, a third Mach-Zehnder modulation portion optically coupled to the first Mach-Zehnder modulation portion and the second Mach-Zehnder modulation portion, and an optical coupler optically coupled to the third Mach-Zehnder modulation portion. The third Mach-Zehnder modulation portion includes a fifth waveguide including an input end optically coupled to an output end of the first waveguide, a sixth waveguide including an input end optically coupled to an output end of the second waveguide, a seventh waveguide including an input end optically coupled to an output end of the third waveguide, an eighth waveguide including an input end optically coupled to an output end of the fourth waveguide, a first electrode connected to the fifth waveguide and the sixth waveguide, and a second electrode connected to the seventh waveguide and the eighth waveguide. The optical coupler is optically coupled to an output end of the fifth waveguide, an output end of the sixth waveguide, an output end of the seventh waveguide, and an output end of the eighth waveguide.

BRIEF DESCRIPTION OF THE DRAWINGS

FIG. 2 is a cross-sectional view taken along line II-II of FIG. 1.

FIG. 3 is a cross-sectional view taken along line III-III of FIG. 1.

DETAILED DESCRIPTION

Figure 1:
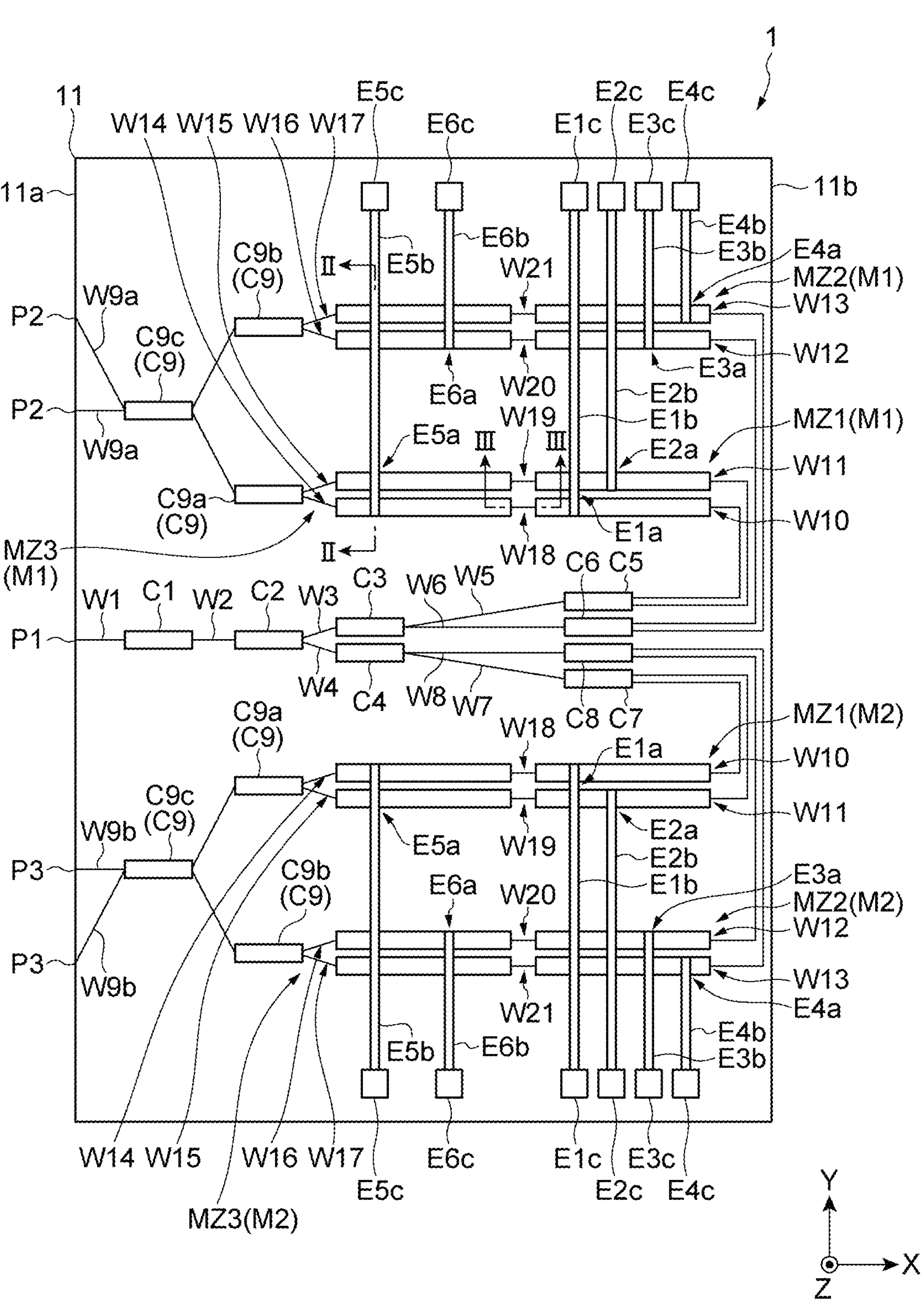
FIG. 1 is a plan view schematically showing an optical modulator according to an embodiment.

In the optical modulator of Patent Literature 1, light from an input waveguide propagates through the first waveguide and the second waveguide, and the light propagated through the respective waveguides is combined by the optical coupler. Similarly, light from the input waveguide propagates through the third waveguide and the fourth waveguide, and the light propagated through the respective waveguides is combined by the optical coupler. The light combined by the optical coupler is guided to the fifth waveguide and the sixth waveguide. In this case, the intensity of light propagating through the fifth waveguide is the sum of the intensity of light propagating through the first waveguide and the intensity of light propagating through the second waveguide. The intensity of the light propagating through the sixth waveguide is the sum of the intensity of the light propagating through the third waveguide and the intensity of the light propagating through the fourth waveguide. Therefore, when the Mach-Zehnder modulation portion including the fifth waveguide and the sixth waveguide is used, the intensity of light input to each waveguide of the Mach-Zehnder modulation portion is higher than the intensity of light propagating through each waveguide of the first waveguide to the fourth waveguide.

The present disclosure provides an optical modulator capable of reducing the intensity of light input to each waveguide of a Mach-Zehnder modulation portion and a method of manufacturing the optical modulator.

Description of Embodiments of Present Disclosure

First, the contents of embodiments of the present disclosure will be listed and explained.

(1) An optical modulator according to an embodiment includes a first Mach-Zehnder modulation portion including a first waveguide and a second waveguide, a second Mach-Zehnder modulation portion including a third waveguide and a fourth waveguide, a third Mach-Zehnder modulation portion optically coupled to the first Mach-Zehnder modulation portion and the second Mach-Zehnder modulation portion, and an optical coupler optically coupled to the third Mach-Zehnder modulation portion. The third Mach-Zehnder modulation portion includes a fifth waveguide including an input end optically coupled to an output end of the first waveguide, a sixth waveguide including an input end optically coupled to an output end of the second waveguide, a seventh waveguide including an input end optically coupled to an output end of the third waveguide, an eighth waveguide including an input end optically coupled to an output end of the fourth waveguide, a first electrode connected to the fifth waveguide and the sixth waveguide, and a second electrode connected to the seventh waveguide and the eighth waveguide. The optical coupler is optically coupled to an output end of the fifth waveguide, an output end of the sixth waveguide, an output end of the seventh waveguide, and an output end of the eighth waveguide.

According to the optical modulator of the embodiment, the intensity of light input to each waveguide (each of the fifth waveguide to the eighth waveguide) of the third Mach-Zehnder modulation portion can be reduced.

(2) In the above (1), the optical modulator may further include a ninth waveguide connecting the output end of the first waveguide and the input end of the fifth waveguide to each other. An upper cladding of the ninth waveguide may include a first electrically conductive type semiconductor layer. An upper cladding of the first waveguide and an upper cladding of the fifth waveguide each may include a second electrically conductive type semiconductor layer.

(3) In the above (1) or (2), the optical coupler may include a first optical coupler optically coupled to the output end of the fifth waveguide and the output end of the sixth waveguide, a second optical coupler optically coupled to the output end of the seventh waveguide and the output end of the eighth waveguide, and a third optical coupler optically coupled to the first optical coupler and the second optical coupler.

(4) A method of manufacturing an optical modulator according to the embodiment, the method comprising: preparing the optical modulator according to any one of (1) to (3), in which the optical modulator further includes a third electrode connected to the first waveguide, a fourth electrode connected to the second waveguide, a fifth electrode connected to the third waveguide, and a sixth electrode connected to the fourth waveguide, adjusting a voltage applied to the third electrode and a voltage applied to the fourth electrode, adjusting a voltage applied to the fifth electrode and a voltage applied to the sixth electrode, adjusting a voltage applied to the first electrode based on a result of adjustment of the voltages applied to the third electrode and the fourth electrode, adjusting a voltage applied to the second electrode based on a result of adjustment of the voltages applied to the fifth electrode and the sixth electrode; and readjusting the voltages applied to the third electrode and the fourth electrode based on a result of adjustment of the voltages applied to the first electrode, readjusting the voltages applied to the fifth electrode and the sixth electrode based on a result of adjustment of the voltages applied to the second electrode.

Details of Embodiments of Present Disclosure

Hereinafter, embodiments of the present disclosure will be described in detail with reference to the accompanying drawings. In the description of the drawings, the same or equivalent elements are denoted by the same reference numerals, and redundant description thereof will be omitted. In the drawings, an X-axis direction, a Y-axis direction, and a Z-axis direction which intersect each other are shown as necessary. The X-axis direction, the Y-axis direction, and the Z-axis direction are orthogonal to each other, for example.

FIG. 1 is a plan view schematically showing an optical modulator according to the embodiment. An optical modulator 1 can modulate the intensity of light or phase of light in optical communication, for example, and generate a modulation signal. Optical modulator 1 may include an input port P1, a substrate 11, an input waveguide W1, waveguides W2, W3, W4, W5, W6, W7, and W8, a light filter C1, optical couplers C2, C3, C4, C5, C6, C7, C8, and C9, a first light modulation portion M1, a second light modulation portion M2, a first output waveguide W9*a*, a first output port P2, a second output waveguide W9*b*, and a second output port P3. Optical modulator 1 may not include optical couplers C4, C7, and C8, second light modulation portion M2, second output waveguide W9*b*, and second output port P3.

Substrate 11 extends along the X-axis direction and the Y-axis direction. Substrate 11 may have a substantially rectangular shape when viewed from the Z-axis direction. When viewed from the Z-axis direction, input port P1 is provided at a first end 11*a* of substrate 11 in the X-axis direction. Input port P1 is located at the center of first end 11*a* of substrate 11 in the Y-axis direction.

Input waveguide W1 is provided on substrate 11. An input end of input waveguide W1 is connected to input port P1. For example, the input end of input waveguide W1 is input port P1. An output end of input waveguide W1 is optically coupled to an input end of light filter C1. An output end of light filter C1 is optically coupled to an input end of waveguide W2. Light filter C1 is, for example, a coupler with one input and one output. An output end of waveguide W2 is optically coupled to an input end of optical coupler C2. An output end of optical coupler C2 is optically coupled to an input end of waveguide W3 and an input end of waveguide W4. Optical coupler C2 is, for example, a multi-mode interface (MMI) coupler with one input and two outputs.

An output end of waveguide W3 is optically coupled to an input end of optical coupler C3. The two output ends of optical coupler C3 are optically coupled to an input end of waveguide W5 and an input end of waveguide W6, respectively. An output end of waveguide W4 is optically coupled to an input end of optical coupler C4. Two output ends of optical coupler C4 are optically coupled to an input end of waveguide W7 and an input end of waveguide W8, respectively. Optical coupler C3 and optical coupler C4 are MMI couplers with one input and two outputs, for example.

An output end of waveguide W5 is optically coupled to an input end of optical coupler C5. An output end of waveguide W6 is optically coupled to an input end of optical coupler C6. An output end of waveguide W7 is optically coupled to an input end of optical coupler C7. An output end of waveguide W8 is optically coupled to an input end of optical coupler C8.

First light modulation portion M1 and second light modulation portion M2 are provided on substrate 11. First light modulation portion M1 and second light modulation portion M2 are disposed so as to sandwich input waveguide W1 in the Y-axis direction. First light modulation portion M1 and second light modulation portion M2 are, for example, IQ optical modulation devices. Each of first light modulation portion M1 and second light modulation portion M2 has a first Mach-Zehnder modulation portion MZ1, a second Mach-Zehnder modulation portion MZ2, and a third Mach-Zehnder modulation portion MZ3.

First Mach-Zehnder modulation portion MZ1 has a waveguide W10 (first waveguide), a waveguide W11 (second waveguide), an electrode Ela (third electrode), and an electrode E2*a* (fourth electrode). Waveguide W10 and waveguide W11 are a first arm waveguide and a second arm waveguide of first Mach-Zehnder modulation portion MZ1, respectively. Waveguide W10 and waveguide W11 are provided on substrate 11 and have a height in the Z-axis direction. An input end of waveguide W10 and an input end of waveguide W11 are optically coupled to two output ends of optical coupler C5, respectively. Optical coupler C5 is, for example, a MMI coupler with one input and two outputs.

Electrode Ela is connected to waveguide W10. Electrode Ela is provided on waveguide W10. Electrode Ela applies a voltage to waveguide W10. Electrode Ela is electrically connected to an electrode pad E1c through a wire E1b. A voltage is applied to electrode pad E1c from a power supply (not shown).

Electrode E2a is connected to waveguide W11. Electrode E2a is provided on waveguide W11. Electrode E2a applies a voltage to waveguide W11. Electrode E2a is electrically connected to an electrode pad E2c through a wire E2b. A voltage is applied to electrode pad E2c from a power supply (not shown).

Second Mach-Zehnder modulation portion MZ2 has a waveguide W12 (third waveguide), a waveguide W13 (fourth waveguide), an electrode E3a (fifth electrode), and an electrode E4a (sixth electrode). Waveguide W12 and waveguide W13 are a first arm waveguide and a second arm waveguide of second Mach-Zehnder modulation portion MZ2, respectively. Waveguide W12 and waveguide W13 are provided on substrate 11 and have a height in the Z-axis direction. An input end of waveguide W12 and an input end of waveguide W13 are optically coupled to two output ends of optical coupler C6, respectively. Optical coupler C6 is, for example, an MMI coupler with one input and two outputs.

Electrode E3a is connected to waveguide W12. Electrode E3a is provided on waveguide W12. Electrode E3a applies a voltage to waveguide W12. Electrode E3a is electrically connected to an electrode pad E3c through a wire E3b. A voltage is applied to electrode pad E3c from a power supply (not shown).

Electrode E4a is connected to waveguide W13. Electrode E4a is provided on waveguide W13. Electrode E4a applies a voltage to waveguide W13. Electrode E4a is electrically connected to an electrode pad E4c through a wire E4b. A voltage is applied to electrode pad E4c from a power supply (not shown).

Third Mach-Zehnder modulation portion MZ3 has a waveguide W14 (fifth waveguide), a waveguide W15 (sixth waveguide), a waveguide W16 (seventh waveguide), a waveguide W17 (eighth waveguide), an electrode E5a (first electrode), and an electrode E6a (second electrode). Waveguide W14 and waveguide W15 extend so as to be spaced apart from each other. Waveguide W16 and waveguide W17 extend so as to be spaced apart from each other. Waveguide W14 and waveguide W15 function as first arm waveguides of third Mach-Zehnder modulation portion MZ3. Waveguide W16 and waveguide W17 function as second arm waveguides of third Mach-Zehnder modulation portion MZ3. Waveguide W14, waveguide W15, waveguide W16, and waveguide W17 are provided on substrate 11 and have a height in the Z-axis direction.

An input end of waveguide W14 is optically coupled to an output end of waveguide W10. An input end of waveguide W15 is optically coupled to an output end of waveguide W11.

An input end of waveguide W16 is optically coupled to an output end of waveguide W12. An input end of waveguide W17 is optically coupled to an output end of waveguide W13.

Electrode E5a is connected to waveguide W14 and waveguide W15. Electrode E5a includes a first portion E5al provided on waveguide W14, a second portion E5a2 provided on waveguide W15, and a third portion E5a3 connecting the first portion and the second portion. Electrode E5a applies voltages to waveguide W14 and waveguide W15. Electrode E5a is electrically connected to an electrode pad E5c through a wire E5b. A voltage is applied to electrode pad E5c from a power supply (not shown).

Electrode E6a is connected to waveguide W16 and waveguide W17. Electrode E6a includes a first portion E6al provided on waveguide W16, a second portion E6a2 provided on waveguide W17, and a third portion (not shown) connecting the first portion and the second portion. Electrode E6a applies voltages to waveguide W16 and waveguide W17. Electrode E6a is electrically connected to an electrode pad E6c through a wire E6b. A voltage is applied to electrode pad E6c from a power supply (not shown).

Figure 2:
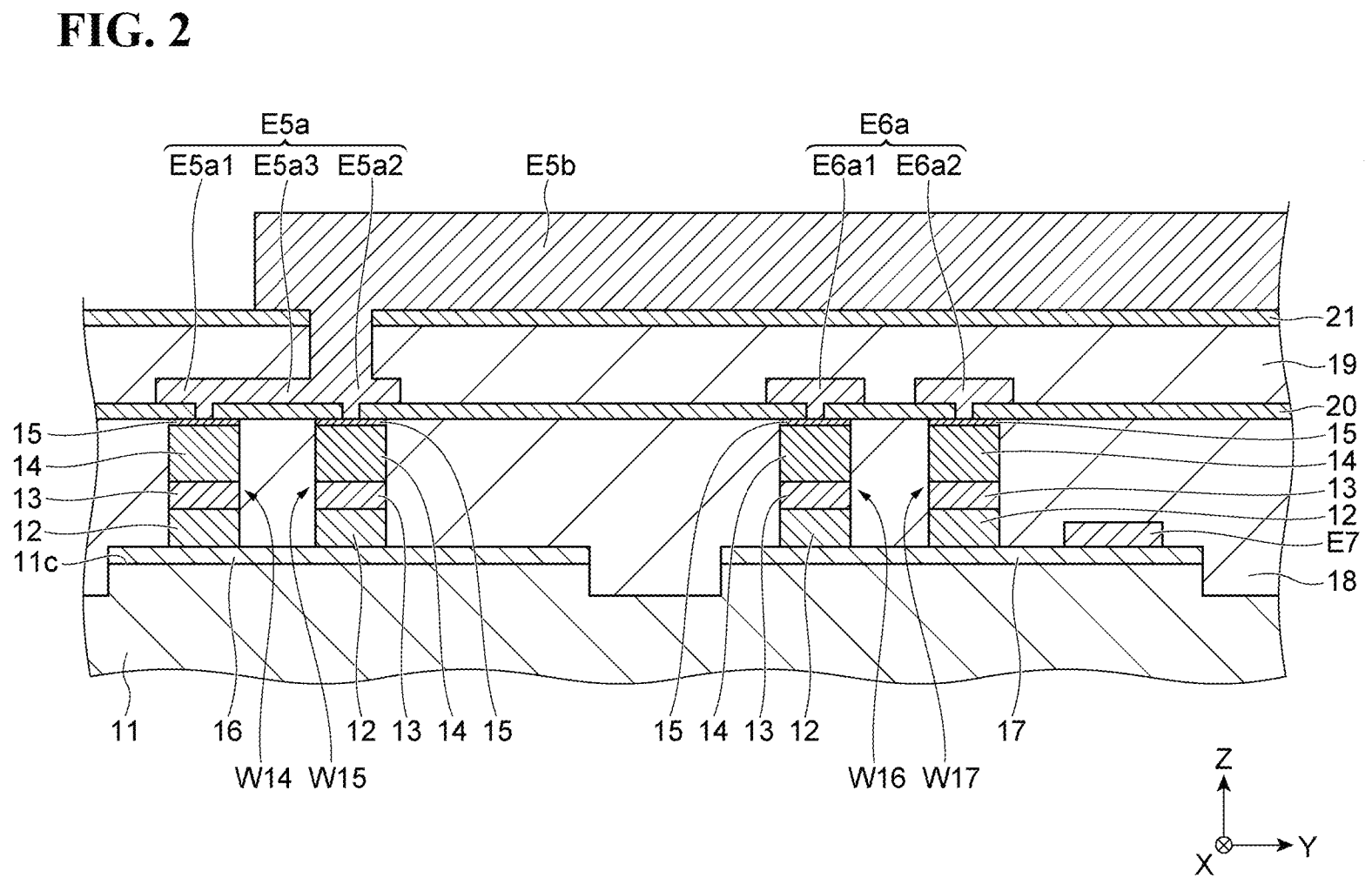

The construction of waveguides W14, W15, W16, and W17 will be described in more detail with reference to FIG. 2. FIG. 2 is a cross-sectional view taken along line II-II of FIG. 1. In FIG. 2, waveguides W14, W15, W16 and W17 are shown in cross-section.

As shown in FIG. 2, each of waveguides W14, W15, W16, and W17 includes a first semiconductor layer 12 of an n-type (first electrically conductive type) provided on substrate 11, a core layer 13 provided on first semiconductor layer 12, a second semiconductor layer 14 of a p-type (second electrically conductive type) provided on core layer 13, and a third semiconductor layer 15 provided on second semiconductor layer 14.

In the embodiment, fourth semiconductor layers 16 and 17 are provided on a major surface 11c of substrate 11 so as to be spaced apart from each other in the Y-axis direction. Fourth semiconductor layer 16 is provided between major surface 11c and first semiconductor layer 12 of waveguide W14 and between major surface 11c and first semiconductor layer 12 of waveguide W15. Fourth semiconductor layer 17 is provided between major surface 11c and first semiconductor layer 12 of waveguide W16 and between major surface 11c and first semiconductor layer 12 of waveguide W17. Fourth semiconductor layers 16 and 17, first semiconductor layer 12, core layer 13, second semiconductor layer 14, and third semiconductor layer 15 are provided in this order on major surface 11c of substrate 11.

First semiconductor layer 12 constitutes a lower cladding of each of waveguides W14, W15, W16, and W17. Second semiconductor layer 14 constitutes an upper cladding of each of waveguides W14, W15, W16, and W17. Third semiconductor layer 15 constitutes an upper contact of each of waveguides W14, W15, W16, and W17. Fourth semiconductor layers 16 and 17 constitute a lower contact of each of waveguides W14, W15, W16, and W17. Core layer 13 of waveguide W14, core layer 13 of waveguide W15, core layer 13 of waveguide W16, and core layer 13 of waveguide W17 are provided to be spaced apart from each other in the Y-axis direction.

Substrate 11 is, for example, a semi-insulating semiconductor substrate. Substrate 11 includes a III-V group compound semiconductor doped with an insulating dopant. Substrate 11 includes, for example, indium phosphide (InP) doped with iron (Fe).

First semiconductor layer 12 includes a III-V group compound semiconductor doped with an n-type dopant. First semiconductor layer 12 includes, for example, InP doped with silicon (Si). Second semiconductor layer 14 includes a III-V group compound semiconductor doped with a p-type dopant. Second semiconductor layer 14 includes, for example, indium gallium arsenide (InGaAs) or InP doped with zinc (Zn). Third semiconductor layer 15 includes a III-V group compound semiconductor doped with a p-type dopant. Third semiconductor layer 15 has a p-type dopant concentration higher than a p-type dopant concentration of second semiconductor layer 14. Third semiconductor layer 15 may include a semiconductor material different from the semiconductor material of second semiconductor layer 14. Third semiconductor layer 15 includes, for example, InGaAs or InP doped with silicon (Si). Fourth semiconductor layers 16 and 17 include a III-V group compound semiconductor doped with an n-type dopant. Fourth semiconductor layers 16 and 17 have an n-type dopant concentration higher than an n-type dopant concentration of first semiconductor layer 12. Fourth semiconductor layers 16 and 17 include, for example, InP doped with silicon (Si).

Core layer 13 is an i-type semiconductor layer, that is, an undoped semiconductor layer. Core layer 13 may have a multi quantum well structure. Core layer 13 includes, for example, an aluminum gallium indium arsenide (AlGaInAs)-based III-V group compound semiconductor.

Resin layers 18 and 19 and electrically insulating films 20 and 21 are further provided on major surface 11*c* of substrate 11. Resin layer 18 is provided on major surface 11*c*. Resin layer 18 is provided so as to embed waveguides W14, W15, W16, and W17 and fourth semiconductor layers 16 and 17. That is, waveguides W14, W15, W16, and W17 and fourth semiconductor layers 16 and 17 are covered with resin layer 18. Electrically insulating film 20 is provided on resin layer 18. Resin layer 19 is provided on electrically insulating film 20. Resin layer 19 is provided so as to embed electrode E5*a* and electrode E6*a*. That is, electrode E5*a* and electrode E6*a* are covered with resin layer 19. Electrically insulating film 21 is provided on resin layer 19.

Resin layers 18 and 19 include, for example, benzocyclobutene (BCB). Electrically insulating films 20 and 21 are protective films including an inorganic material. Electrically insulating films 20 and 21 are protective films including, for example, silicon oxide ($SiO_2$). Alternatively, electrically insulating films 20 and 21 may be protective films including silicon oxynitride (SiON).

Electrode E5*a* is connected to third semiconductor layer 15 and second semiconductor layer 14 of waveguide W14. Similarly, electrode E5*a* is connected to third semiconductor layer 15 and second semiconductor layer 14 of waveguide W15. Electrode E5*a* is in ohmic contact with each of corresponding third semiconductor layers 15. Electrode E5*a* includes, for example, a platinum (Pt) layer, a titanium (Ti) layer, and a gold (Au) layer.

As described above, wire E5*b* is connected to electrode E5*a*. Specifically, as shown in FIG. 2, wire E5*b* penetrates resin layer 19 and electrically insulating film 21 and is connected to electrode E5*a*. Wire E5*b* includes, for example, a titanium tungsten (TiW) layer, a Pt layer, and an Au layer.

A ground electrode (not shown) is provided on fourth semiconductor layer 16 at a position spaced apart from waveguides W14 and W15. The ground electrode includes, for example, an alloy layer of Au, germanium (Ge), and nickel (Ni), a Ti layer, a Pt layer, and an Au layer. The ground electrode is electrically connected to fourth semiconductor layer 16.

Electrode E6*a* is connected to third semiconductor layer 15 and second semiconductor layer 14 of waveguide W16. Similarly, electrode E6*a* is connected to third semiconductor layer 15 and second semiconductor layer 14 of waveguide W17. Electrode E6*a* is in ohmic contact with each of corresponding third semiconductor layers 15. Electrode E6*a* includes, for example, a platinum (Pt) layer, a titanium (Ti) layer, and a gold (Au) layer.

As described above, wire E6*b* is connected to electrode E6*a*. Although not shown, wire E6*b* penetrates resin layer 19 and electrically insulating film 21 and is connected to electrode E6*a*, similarly to wire E5*b*. Wire E6*b* includes, for example, a titanium tungsten (TiW) layer, a Pt layer, and an Au layer.

A ground electrode E7 is provided on fourth semiconductor layer 17 at a position spaced apart from waveguides W16 and W17. Ground electrode E7 includes, for example, an alloy layer of Au, germanium (Ge), and nickel (Ni), a Ti layer, a Pt layer, and an Au layer. Ground electrode E7 is electrically connected to fourth semiconductor layer 17.

In third Mach-Zehnder modulation portion MZ3, voltages are applied between electrode E5*a* and the ground electrode, and between electrode E6*a* and ground electrode E7. For example, a direct current reverse bias voltage and an alternating-current voltage are applied in a superimposed manner between electrode E5*a* and the ground electrode, and between electrode E6*a* and ground electrode E7. As a result, an electric signal flows between electrode E5*a* and the ground electrode, and between electrode E6*a* and ground electrode E7. The electric signal changes the refractive index of waveguides W14, W15, W16, and W17. As a result, the phase of the light propagating through waveguides W14, W15, W16, and W17 is modulated.

In the embodiment, waveguide W10 and waveguide W11 have the same structure as waveguide W14 and waveguide W15, respectively. That is, each of waveguide W10 and waveguide W11 includes n-type first semiconductor layer 12 provided on substrate 11, core layer 13 provided on first semiconductor layer 12, p-type second semiconductor layer 14 provided on core layer 13, and third semiconductor layer 15 provided on second semiconductor layer 14.

In the embodiment, waveguide W12 and waveguide W13 have the same structure as waveguide W16 and waveguide W17, respectively. That is, each of waveguide W12 and waveguide W13 includes n-type first semiconductor layer 12 provided on substrate 11, core layer 13 provided on first semiconductor layer 12, p-type second semiconductor layer 14 provided on core layer 13, and third semiconductor layer 15 provided on second semiconductor layer 14.

Although not shown, electrode Ela is connected to third semiconductor layer 15 and second semiconductor layer 14 of waveguide W10. Electrode Ela is in ohmic contact with third semiconductor layer 15 of waveguide W10. Similarly, electrode E2*a* is connected to third semiconductor layer 15 and second semiconductor layer 14 of waveguide W11. Electrode E2*a* is in ohmic contact with third semiconductor layer 15 of waveguide W11. Electrode Ela and electrode E2*a* include, for example, a platinum (Pt) layer, a titanium (Ti) layer, and a gold (Au) layer.

An electrode (not shown) is provided on fourth semiconductor layer 16 at a position spaced apart from each of waveguides W10 and W11. The electrode includes, for example, an alloy layer of Au, germanium (Ge), and nickel (Ni), a Ti layer, a Pt layer, and an Au layer. The electrode is electrically connected to fourth semiconductor layer 16.

In first Mach-Zehnder modulation portion MZ1, a voltage is applied between electrode Ela and electrode E2*a* and an electrode (not shown). For example, a direct current reverse bias voltage and an alternating-current voltage are applied in a superimposed manner between electrode Ela and electrode E2*a* and the electrode (not shown). As a result, an electric signal flows between electrode Ela and electrode E2*a* and the electrode (not shown). The electric signal changes the refractive index of waveguides W10 and W11. As a result, the phase of the light propagating through waveguides W10 and W11 is modulated.

Although not shown, electrode E3*a* is connected to third semiconductor layer 15 and second semiconductor layer 14 of waveguide W12. Electrode E3*a* is in ohmic contact with third semiconductor layer 15 of waveguide W12. Similarly, electrode E4*a* is connected to third semiconductor layer 15 and second semiconductor layer 14 of waveguide W13. Electrode E4*a* is in ohmic contact with third semiconductor layer 15 of waveguide W13. Electrode E3*a* and electrode E4*a* include, for example, a platinum (Pt) layer, a titanium (Ti) layer, and a gold (Au) layer.

An electrode (not shown) is provided on fourth semiconductor layer 17 at a position spaced apart from each of waveguides W12 and W13. The electrode includes, for example, an alloy layer of Au, germanium (Ge), and nickel (Ni), a Ti layer, a Pt layer, and an Au layer. The electrode is electrically connected to fourth semiconductor layer 17.

In second Mach-Zehnder modulation portion MZ2, a voltage is applied between electrode E3*a* and electrode E4*a* and an electrode (not shown). For example, a direct current reverse bias voltage and an alternating-current voltage are applied in a superimposed manner between electrode E3*a* and electrode E4*a* and the electrode (not shown). As a result, an electric signal flows between electrode E3*a* and electrode E4*a* and the electrode (not shown). The electric signal changes the refractive index of waveguides W12 and W13. As a result, the phase of the light propagating through waveguides W12 and W13 is modulated.

Refer again to FIG. 1. In the embodiment, optical coupler C9 includes an optical coupler C9*a* (first optical coupler), an optical coupler C9*b* (second optical coupler), and an optical coupler C9*c* (third optical coupler). Optical couplers C9*a*, C9*b*, and C9*c* are arranged closer to first end 11*a* of substrate 11 than third Mach-Zehnder modulation portion MZ3 in the X-axis direction.

Optical coupler C9*a* is optically coupled to an output end of waveguide W14 and an output end of waveguide W15. Specifically, the output end of waveguide W14 and the output end of waveguide W15 are optically coupled to two input ends of optical coupler C9*a*, respectively.

Optical coupler C9*b* is optically coupled to an output end of waveguide W16 and an output end of waveguide W17. Specifically, the output end of waveguide W16 and the output end of waveguide W17 are optically coupled to two input ends of optical coupler C9*b*, respectively.

An output end of optical coupler C9*a* and an output end of optical coupler C9*b* are optically coupled to two input ends of optical coupler C9*c*, respectively. That is, optical coupler C9*c* is optically coupled to optical coupler C9*a* and optical coupler C9*b*. Optical coupler C9*a* and optical coupler C9*b* are, for example, MMI couplers with two inputs and one output.

In the embodiment, in first light modulation portion M1, two first output waveguides W9*a* are optically coupled to two output ends of optical coupler C9*c*, respectively. In second light modulation portion M2, two second output waveguides W9*b* are optically coupled to the two output ends of optical coupler C9*c*, respectively. Optical coupler C9*c* is, for example, a MMI coupler with two inputs and two outputs. Two first output waveguides W9*a* are connected to two first output ports P2, respectively. For example, each of the output ends of first output waveguide W9*a* is first output port P2. Two second output waveguides W9*b* are connected to two second output ports P3, respectively. For example, each of output ends of second output waveguide W9*b* is second output port P3.

First output port P2 and second output port P3 are provided at first end 11*a* of substrate 11 in the X-axis direction. First output port P2 and second output port P3 are provided so as to sandwich input port P1 in the Y-axis direction.

Next, with reference to FIG. 3, the connection between waveguides W10, W11, W12, and W13 and corresponding waveguides W14, W15, W16, and W17 in the embodiment will be described in more detail.

In the embodiment, first light modulation portion M1 and second light modulation portion M2 further include waveguides W18 (ninth waveguide), W19, W20, and W21 that connect waveguides W10, W11, W12, and W13 and corresponding waveguides W14, W15, W16, and W17. FIG. 3 is a cross-sectional view taken along line III-III of FIG. 1. In FIG. 3, waveguides W10, W14, and W18 are shown in cross-section. In FIG. 3, the components (electrodes, etc.) on waveguides W10, W14, and W18 are omitted. Waveguide W18, waveguide W19, waveguide W20, and waveguide W21 are provided on substrate 11 and have a height in the Z-axis direction.

Waveguide W18 connects the output end of waveguide W10 and the input end of waveguide W14. Specifically, the output end of waveguide W10 is connected to an input end of waveguide W18, and the input end of waveguide W14 is connected to an output end of waveguide W18. Thus, the output end of waveguide W10 is optically coupled to the input end of waveguide W14. The output end of waveguide W10 is optically coupled to the input end of waveguide W14 through waveguide W18. That is, the output end of waveguide W10 and the input end of waveguide W14 are optically coupled without an optical coupler. The length of waveguide W18 may be 10 μm or more, or may be 2000 μm or less. In the embodiment, the length of waveguide W18 is defined by the length in the X-axis direction.

Figure 3:
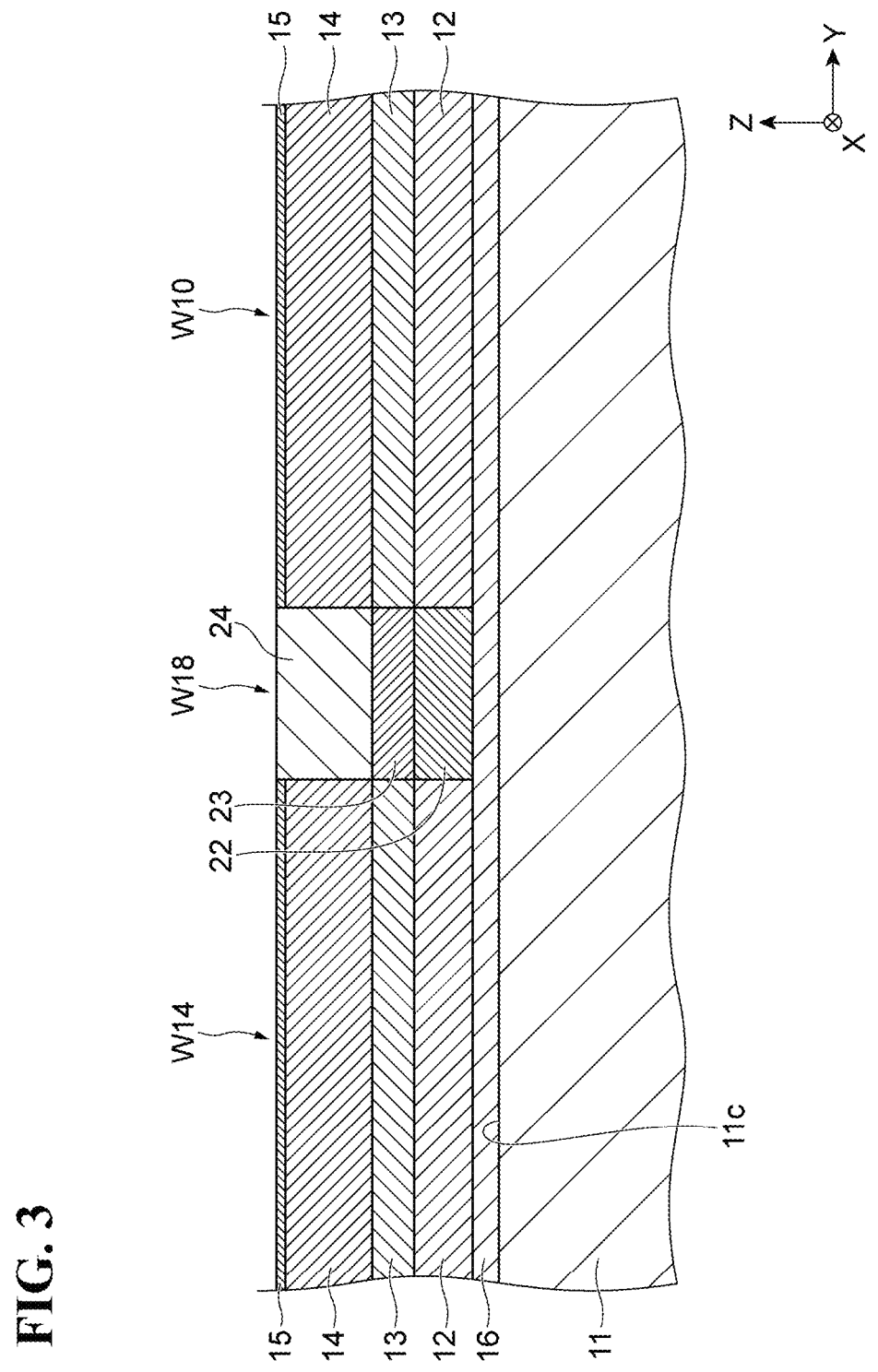

As shown in FIG. 3, waveguide W18 includes an n-type sixth semiconductor layer 22 provided on fourth semiconductor layer 16, a core layer 23 provided on sixth semiconductor layer 22, and an n-type seventh semiconductor layer 24 provided on core layer 23. No electrode is connected to waveguide W18.

Sixth semiconductor layer 22 constitutes a lower cladding of waveguide W18. Seventh semiconductor layer 24 constitutes an upper cladding of waveguide W18. Sixth semiconductor layer 22 and seventh semiconductor layer 24 include a III-V group compound semiconductor doped with an n-type dopant. Sixth semiconductor layer 22 and seventh semiconductor layer 24 include, for example, InP doped with silicon (Si).

As described above, seventh semiconductor layer 24 is an n-type semiconductor layer, and third semiconductor layer 15 is a p-type semiconductor layer. That is, the upper cladding of waveguide W10 and the upper cladding of waveguide W14, and the upper cladding of waveguide W18 are formed of semiconductor layers of different electrically conductive types.

Core layer 23 is an i-type semiconductor layer, that is, an undoped semiconductor layer. Core layer 23 may have a multi quantum well structure. Core layer 23 includes, for example, an aluminum gallium indium arsenide (AlGaInAs)-based III-V group compound semiconductor.

Waveguide W19 connects the output end of waveguide W11 and the input end of waveguide W15. Specifically, the output end of waveguide W11 is connected to an input end of waveguide W19, and the input end of waveguide W15 is connected to an output end of waveguide W19. Thus, the output end of waveguide W11 is optically coupled to the input end of waveguide W15. The output end of waveguide W11 is optically coupled to the input end of waveguide W15 through waveguide W19. That is, the output end of waveguide W11 and the input end of waveguide W15 are optically coupled without an optical coupler. The length of waveguide W19 may be the same as the length of waveguide W18. In the embodiment, the length of waveguide W19 is defined by the length in the X-axis direction.

Waveguide W20 connects the output end of waveguide W12 and the input end of waveguide W16. Specifically, the output end of waveguide W12 is connected to an input end of waveguide W20, and the input end of waveguide W16 is connected to an output end of waveguide W20. Thus, the output end of waveguide W12 is optically coupled to the input end of waveguide W16. The output end of waveguide W12 is optically coupled to the input end of waveguide W16 through waveguide W20. That is, the output end of waveguide W12 and the input end of waveguide W16 are optically coupled without an optical coupler. The length of waveguide W20 may be the same as the length of waveguide W18. In the embodiment, the length of waveguide W20 is defined by the length in the X-axis direction.

Waveguide W21 connects the output end of waveguide W13 and the input end of waveguide W17. Specifically, the output end of waveguide W13 is connected to an input end of waveguide W21, and the input end of waveguide W17 is connected to an output end of waveguide W21. Thus, the output end of waveguide W13 is optically coupled to the input end of waveguide W17. The output end of waveguide W13 is optically coupled to the input end of waveguide W17 through waveguide W21. That is, the output end of waveguide W13 and the input end of waveguide W17 are optically coupled without an optical coupler. The length of waveguide W21 may be the same as the length of waveguide W18. In the embodiment, the length of waveguide W21 is defined by the length in the X-axis direction.

In the embodiment, waveguide W19, waveguide W20, and waveguide W21 have the same structure as waveguide W18. That is, waveguide W19 includes n-type sixth semiconductor layer 22 provided on fourth semiconductor layer 16, core layer 23 provided on sixth semiconductor layer 22, and n-type seventh semiconductor layer 24 provided on core layer 23. Each of waveguide W20 and waveguide W21 includes n-type sixth semiconductor layer 22 provided on fourth semiconductor layer 17, core layer 23 provided on sixth semiconductor layer 22, and n-type seventh semiconductor layer 24 provided on core layer 23.

Therefore, the upper cladding of waveguide W11 and the upper cladding of waveguide W15, and the upper cladding of waveguide W19 are formed of semiconductor layers of different electrically conductive types. The upper cladding of waveguide W12 and the upper cladding of waveguide W16, and the upper cladding of waveguide W20 are formed of semiconductor layers of different electrically conductive types. The upper cladding of waveguide W13 and the upper cladding of waveguide W17, and the upper cladding of waveguide W21 are formed of semiconductor layers of different electrically conductive types.

In optical modulator 1 of the embodiment, waveguide W14 has an input end optically coupled to the output end of waveguide W10. Waveguide W15 has an input end optically coupled to the output end of waveguide W11. Waveguide W16 has an input end optically coupled to the output end of waveguide W12. Waveguide W17 has an input end optically coupled to the output end of waveguide W13. That is, waveguide W10 and waveguide W14 are optically coupled to each other in a one-to-one relationship. Waveguide W11 and waveguide W15 are optically coupled to each other in a one-to-one relationship. Waveguide W12 and waveguide W16 are optically coupled to each other in a one-to-one relationship. Waveguide W13 and waveguide W17 are optically coupled to each other in a one-to-one relationship. Therefore, the intensity of light propagating through each of waveguides W10, W11, W12, and W13 can be made substantially equal to the intensity of light propagating through each waveguide of waveguides W14, W15, W16, and W17. As a result, the intensity of light input to each waveguide of waveguides W14, W15, W16, and W17 of third Mach-Zehnder modulation portion MZ3 can be reduced.

Figure 4:
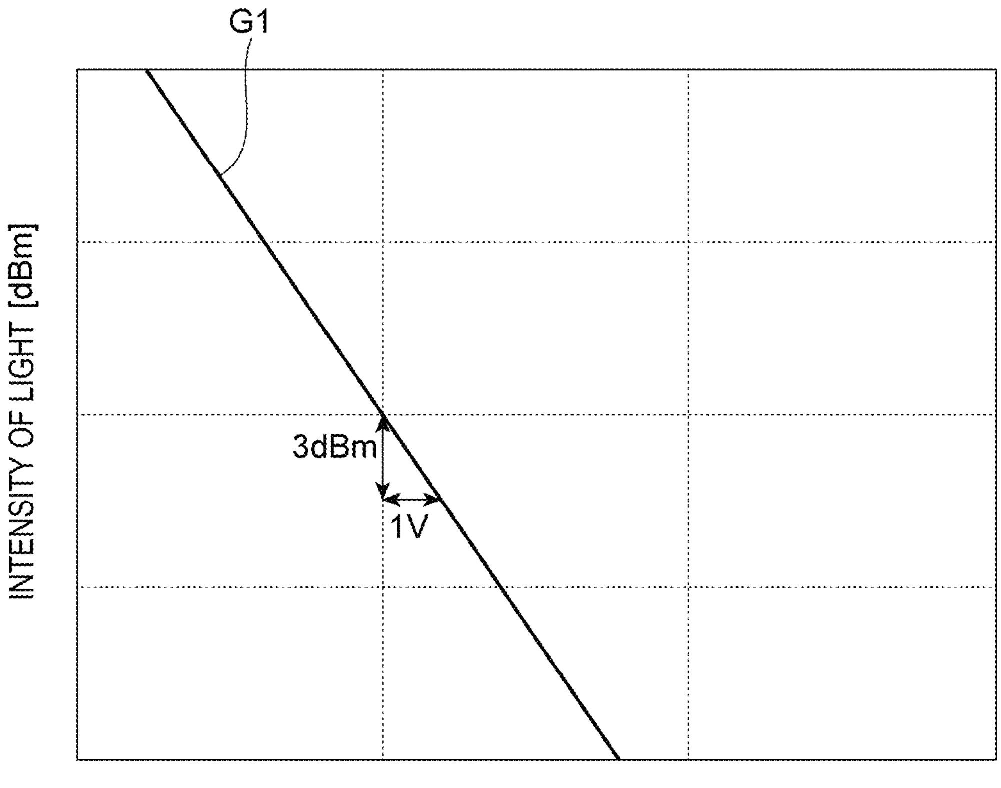
FIG. 4 is a diagram showing the relationship between the intensity of light propagating through a waveguide and the voltage that can be applied to an electrode connected to the waveguide.

The magnitude of the voltage that can be applied to the waveguide depends on the intensity of the light propagating through the waveguide. Specifically, when the intensity of light propagating through a waveguide decreases, the voltage that can be applied to the electrode connected to the waveguide increases. The relationship between the intensity of light propagating through a waveguide and the voltage that can be applied to the electrode connected to the waveguide will now be described in more detail with reference to FIG. 4. FIG. 4 is a diagram showing the relationship between the intensity of light propagating through the waveguide and the voltage that can be applied to the electrode connected to the waveguide. The vertical axis is the intensity of light (dBm). The horizontal axis is voltage (V).

In FIG. 4, a graph G1 shows the relationship between the intensity of light at a wavelength of 1530 nm and the maximum voltage that can be applied to the electrode connected to the waveguide when light propagates through the waveguide at the intensity.

As shown in graph G1, when the intensity of light is low, the maximum voltage that can be applied to the electrode is high. For example, when the intensity of light is decreased by 3 dBm, the maximum voltage that can be applied to the electrode is increased by about 1 V. Therefore, if the intensity of light propagating through the waveguide can be reduced, the voltage applied to the electrode connected to the waveguide can be increased, and thus the modulable phase range can be expanded.

In optical modulator 1, as described above, the intensity of light input to waveguides W14, W15, W16, and W17 of third Mach-Zehnder modulation portion MZ3 can be reduced. Therefore, in optical modulator 1, the modulable phase can be expanded in third Mach-Zehnder modulation portion MZ3, as compared with an optical modulator in which the third Mach-Zehnder modulation portion has two arm waveguides. Alternatively, in optical modulator 1, the intensity of light to be input to input waveguide W1 can be increased while maintaining the modulable phase range to be equal to that of the optical modulator. As a result, optical modulator 1 can increase the intensity of the emitted light.

Figure 5:
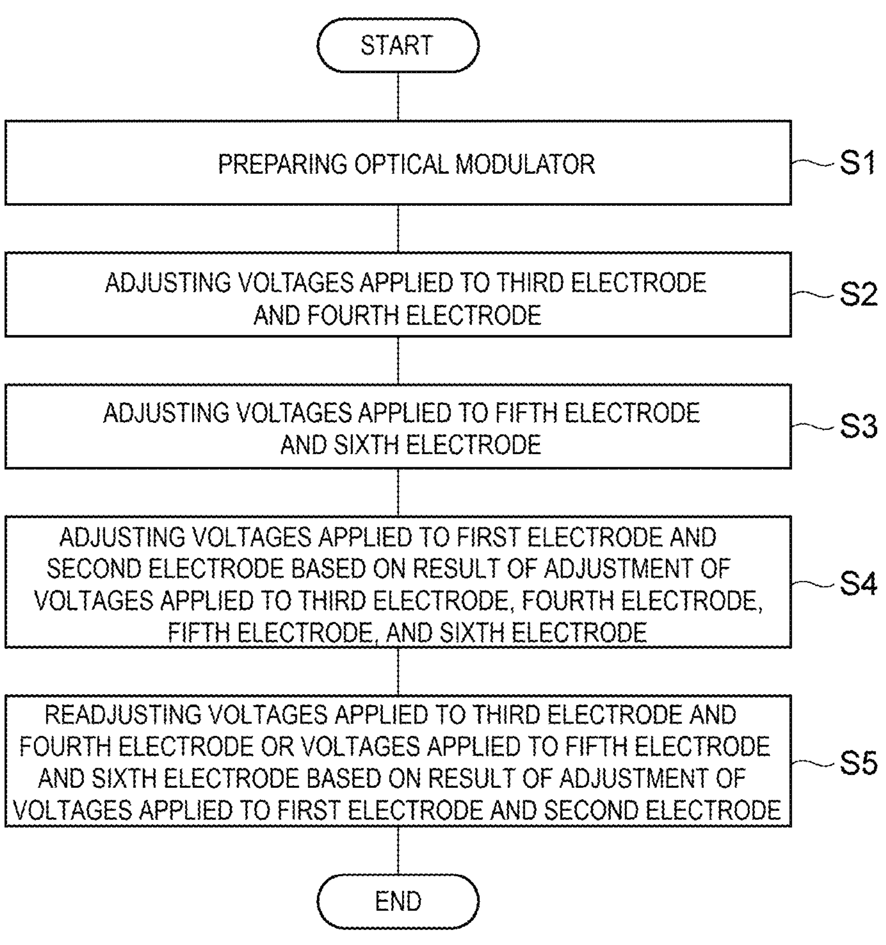
FIG. 5 is a flowchart showing a method of manufacturing an optical modulator according to the embodiment.

Next, a method of manufacturing the optical modulator according to the embodiment will be described with reference to FIG. 5. FIG. 5 is a flowchart showing a method of manufacturing an optical modulator according to the embodiment. Optical modulator 1 can be manufactured as follows.

First, optical modulator 1 is prepared (step S1). Each waveguide included in optical modulator 1 can be formed by processing a semiconductor stack by photolithography and etching. Each electrode included in optical modulator 1 may be formed by lift-off.

Next, voltages applied to electrode Ela and electrode E2*a* are adjusted (step S2). In step S2, the voltages applied to electrode Ela and electrode E2*a* are adjusted so that the intensity of the output light at first output port P2 and second output port P3 becomes the maximum.

In the present manufacturing method, the voltages applied to electrode Ela and electrode E2*a* are adjusted, for example, as follows. First, a voltage applied to electrode Ela is adjusted. At this time, a voltage applied to electrode E2*a* is fixed. The voltage applied to electrode E2*a* is fixed to, for example, 0 V. Next, the intensity of the output light is measured while changing the value of the voltage applied to electrode Ela within a predetermined range. The range is set to, for example, −15 V to 0 V. Next, a voltage value corresponding to the maximum intensity among the measured intensities of the output light is recorded.

Subsequently, the voltage applied to electrode E2*a* is adjusted in the same manner as the voltage applied to electrode Ela is adjusted. Then, an absolute value of the voltage value recorded in electrode Ela and an absolute value of the voltage value recorded in electrode E2*a* are compared. The voltage value with the smaller absolute value is set as the voltage to be applied to the corresponding electrode, and the voltage to be applied to the other electrode is set to 0 V. For example, when the absolute value of the voltage value recorded in electrode Ela is smaller than the absolute value of the voltage value recorded in electrode E2*a*, the voltage applied to electrode Ela is set to the recorded voltage value, and the voltage applied to electrode E2*a* is set to 0 V.

In step S2, voltages applied to electrode E3*a*, electrode E4*a*, and electrode E6*a* are fixed to the extinction voltage, and the voltage applied to electrode E5*a* is fixed. The extinction voltage is set to, for example, −18 V. The voltage applied to electrode E5*a* is fixed to, for example, 0 V.

Next, the voltages applied to electrode E3*a* and electrode E4*a* are adjusted (step S3). In step S3, the voltages applied to electrode E3*a* and electrode E4*a* are adjusted so that the intensity of the output light at first output port P2 and second output port P3 becomes the maximum. In the present manufacturing method, for example, the voltages applied to electrode E3*a* and electrode E4*a* are adjusted in the same manner as in step S2 in which the voltages applied to electrode Ela and electrode E2*a* are adjusted.

Next, based on the result (the result of step S2 and step S3) of adjustment of the voltages applied to electrode Ela, electrode E2*a*, electrode E3*a*, and electrode E4*a*, the voltages applied to electrode E5*a* and electrode E6*a* are adjusted (step S4). In step S4, the voltages applied to electrode E5*a* and electrode E6*a* are adjusted so that the intensity of the output light at first output port P2 and second output port P3 becomes the maximum based on the result of adjustment of the voltages applied to electrode Ela, electrode E2*a*, electrode E3*a*, and electrode E4*a*.

In the present manufacturing method, the voltages applied to electrode E5*a* and electrode E6*a* are adjusted, for example, as follows. First, the voltage applied to electrode E5*a* is adjusted. At this time, the voltage applied to electrode E6*a* is fixed. The voltage applied to electrode E6*a* is fixed to, for example, 0 V. Next, the intensity of the output light is measured while changing the value of the voltage applied to electrode E5*a* within a predetermined range. The range is set to, for example, −15 V to 0 V. Next, a voltage value corresponding to the maximum intensity among the measured intensities of the output light is recorded.

Subsequently, the voltage applied to electrode E6*a* is adjusted in the same manner as the voltage applied to electrode E5*a* is adjusted. Then, an absolute value of the voltage value recorded in electrode E5*a* and an absolute value of the voltage value recorded in electrode E6*a* are compared. The voltage value with the smaller absolute value is set as the voltage to be applied to the corresponding electrode, and the voltage to be applied to the other electrode is set to 0 V. For example, when the absolute value of the voltage value recorded in electrode E5*a* is smaller than the absolute value of the voltage value recorded in electrode E6*a*, the voltage applied to electrode E5*a* is set to the recorded voltage value, and the voltage applied to electrode E6*a* is set to 0 V. In step S4, the voltages applied to electrode Ela, electrode E2*a*, electrode E3*a*, and electrode E4*a* are set to voltages based on the result of adjustment in step S2 and step S3.

Next, based on the result of adjustment of the voltages applied to electrode E5*a* and electrode E6*a*, the voltages applied to electrode Ela and electrode E2*a* or the voltages applied to electrode E3*a* and electrode E4*a* are readjusted (step S5). In step S5, the voltages applied to electrode Ela and electrode E2*a* or the voltages applied to electrode E3*a* and electrode E4*a* are readjusted so that the intensity of the output light at first output port P2 and second output port P3 becomes the maximum based on the result of adjustment of the voltages applied to electrode E5*a* and electrode E6*a*.

In the present manufacturing method, the voltages applied to electrode Ela and electrode E2*a* or the voltages applied to electrode E3*a* and electrode E4*a* are readjusted, for example, as follows. When the voltage applied to electrode E5*a* is set to the voltage value recorded in step S4 and the voltage applied to electrode E6*a* is set to 0 V, the voltages applied to electrode Ela and electrode E2*a* are readjusted.

In detail, among electrode Ela and electrode E2*a*, the electrode to which the voltage value recorded in step S2 is set is readjusted. For example, in step S2, when the voltage applied to electrode Ela is set to the recorded voltage value and the voltage applied to electrode E2*a* is set to 0 V, the voltage applied to electrode Ela is readjusted. In this case, first, the intensity of the output light is measured again while changing the voltage value applied to electrode Ela within a predetermined range. At this time, the voltages applied to electrode E2*a*, electrode E3*a*, and electrode E4*a* are set to the voltages adjusted in step S2 and step S3, respectively. The range is set to, for example, a range similar to step S2. Next, a voltage corresponding to the maximum intensity among the measured intensities of the output light is set as a voltage to be applied to electrode Ela.

On the other hand, when the voltage applied to electrode E5*a* is set to 0 V and the voltage applied to electrode E6*a* is set to the voltage value recorded in step S4, the voltages applied to electrode E3*a* and electrode E4*a* are readjusted in the same manner as the above-described method. That is, in step S5, the voltage applied to the electrode corresponding to the electrode to which the voltage value recorded in step S4 is set, among electrode E5*a* and electrode E6*a*, is readjusted.

According to the present manufacturing method, it is possible to provide optical modulator 1 capable of reducing the intensity of light input to each of waveguides W14, W15, W16, and W17 of third Mach-Zehnder modulation portion MZ3.

In optical modulator 1, voltages are applied to waveguide W14 and waveguide W15 by electrode E5*a*, and voltages are applied to waveguide W16 and waveguide W17 by electrode E6*a*. In this case, when optical modulator 1 is manufactured without step S5, even if the same voltages are applied to waveguide W14 and waveguide W15, the modulation quantity of the phase of the light propagating through waveguide W14 and waveguide W15 may vary due to the individual difference between the waveguides. The same applies to waveguide W16 and waveguide W17.

In the present manufacturing method, after the voltages applied to electrode E5*a* and electrode E6*a* are adjusted, the voltages applied to electrode Ela and electrode E2*a* or the voltages applied to electrode E3*a* and electrode E4*a* are readjusted based on the result of the adjustment. Therefore, the difference in the modulation quantity of the phase of light due to the individual difference between waveguide W14 and waveguide W15 is eliminated by the readjustment of the voltages applied to electrode Ela and electrode E2*a*. Similarly, by readjusting the voltages applied to electrode E3*a* and electrode E4*a*, the difference in the modulation quantity of the phase of the light due to the individual difference between waveguide W16 and waveguide W17 is eliminated. As a result, according to the present manufacturing method, it is possible to suppress the occurrence of variations in the modulation quantity of the phase of light between waveguide W14 and waveguide W15 and the modulation quantity of the phase of light between waveguide W16 and waveguide W17.

While the present disclosure has been described in detail with reference to the preferred embodiments, the present disclosure is not limited to the embodiments described above.

In the above-described embodiment, third semiconductor layer 15 is a p-type semiconductor layer, and seventh semiconductor layer 24 is an n-type semiconductor layer. However, the combination of the electrically conductive type of third semiconductor layer 15 and the electrically conductive type of seventh semiconductor layer 24 is not limited to the above-described combination. That is, third semiconductor layer 15 may be an n-type semiconductor layer, and seventh semiconductor layer 24 may be a p-type semiconductor layer.

In the above embodiment, waveguide W19, waveguide W20, and waveguide W21 have the same structure as waveguide W18. However, the structures of waveguide W19, waveguide W20, and waveguide W21 are not limited to the above-described structures. That is, waveguide W19, waveguide W20, and waveguide W21 may have a structure different from that of waveguide W18.

In the embodiment described above, the output end of waveguide W10 is optically coupled to the input end of waveguide W14 through waveguide W18. The output end of waveguide W11 is optically coupled to the input end of waveguide W15 through waveguide W19. The output end of waveguide W12 is optically coupled to the input end of waveguide W16 through waveguide W20. The output end of waveguide W13 is optically coupled to the input end of waveguide W17 through waveguide W21.

However, the connection between waveguides W10, W11, W12, and W13 and corresponding waveguides W14, W15, W16, and W17 is not limited to the above-described connection. For example, optical modulator 1 may not include at least one waveguide of waveguides W18, W19, W20, and W21. When optical modulator 1 does not include waveguide W18, the output end of waveguide W10 may be directly connected to the input end of waveguide W14. Similarly, the output end of waveguide W11 may be directly connected to the input end of waveguide W15, the output end of waveguide W12 may be directly connected to the input end of waveguide W16, and the output end of waveguide W13 may be directly connected to the input end of waveguide W17.

In the above-described embodiment, optical coupler C9 includes optical coupler C9 an optical coupler C9*b*, and optical coupler C9*c*. However, optical coupler C9 may be optically coupled to the output end of waveguide W14, the output end of waveguide W15, the output end of waveguide W16, and the output end of waveguide W17, and optical coupler C9*a*, optical coupler C9*b*, or optical coupler C9*c* can be omitted in optical coupler C9. In this case, the output end of waveguide W14, the output end of waveguide W15, the output end of waveguide W16, and the output end of waveguide W17 are directly connected to the input ends of optical coupler C9. That is, optical coupler C9 may be a MMI coupler with four inputs and two outputs.

In the above-described manufacturing method, the voltages applied to electrodes Ela, E2*a*, E3*a*, E4*a* and electrodes E5*a*, E6*a* are adjusted so that the intensity of the output light at first output port P2 and second output port P3 becomes the maximum. However, the voltages applied to electrodes Ela, E2*a*, E3*a*, E4*a* and electrodes E5*a*, E6*a* are not necessarily adjusted so that the intensity of the emitted light becomes the maximum.

For example, the voltages applied to electrodes Ela, E2*a*, E3*a*, E4*a* and electrodes E5*a*, E6*a* may be adjusted so that the intensity of the output light at first output port P2 and second output port P3 becomes the minimum. Alternatively, the voltages applied to electrodes Ela, E2*a*, E3*a*, E4*a* and electrodes E5*a*, E6*a* may be adjusted so that the intensity of the output light at first output port P2 and second output port P3 becomes a predetermined value.

In these cases, in step S2, the voltages applied to electrode Ela and electrode E2*a* may be adjusted so that the intensity of the output light at first output port P2 and second output port P3 becomes the minimum or the predetermined value. In step S3, the voltages applied to electrode E3*a* and electrode E4*a* may be adjusted so that the intensity of the output light at first output port P2 and second output port P3 becomes the minimum or the predetermined value. In step S4, the voltages applied to electrode E5*a* and electrode E6*a* may be adjusted based on the result of adjustment of the voltages applied to electrode Ela, electrode E2*a*, electrode E3*a*, and electrode E4*a* so that the intensity of the output light at first output port P2 and second output port P3 become minimum or the predetermined value. In step S5, the voltages applied to electrode Ela and electrode E2*a* or the voltages applied to electrode E3*a* and electrode E4*a* may be readjusted based on the result of adjustment of the voltages applied to electrode E5*a* and electrode E6*a* so that the intensity of the output light at first output port P2 and second output port P3 are minimized or have the predetermined value.

The embodiments disclosed herein are to be considered in all respects as illustrative and not restrictive. The scope of the present invention is defined by the appended claims rather than the foregoing description, and is intended to include all modifications within the scope and meaning equivalent to the appended claims.

What is claimed is:

1. An optical modulator comprising:

a first Mach-Zehnder modulation portion including a first waveguide and a second waveguide;

a second Mach-Zehnder modulation portion including a third waveguide and a fourth waveguide;

a third Mach-Zehnder modulation portion optically coupled to the first Mach-Zehnder modulation portion and the second Mach-Zehnder modulation portion; and an optical coupler optically coupled to the third Mach-Zehnder modulation portion, wherein the third Mach-Zehnder modulation portion includes a fifth waveguide including an input end optically coupled to an output end of the first waveguide, a sixth waveguide including an input end optically coupled to an output end of the second waveguide, a seventh waveguide including an input end optically coupled to an output end of the third waveguide, an eighth waveguide including an input end optically coupled to an output end of the fourth waveguide, a first electrode connected to the fifth waveguide and the sixth waveguide, and a second electrode connected to the seventh waveguide and the eighth waveguide, and wherein the optical coupler is optically coupled to an output end of the fifth waveguide, an output end of the sixth waveguide, an output end of the seventh waveguide, and an output end of the eighth waveguide.

2. The optical modulator according to claim 1, further comprising:

a ninth waveguide connecting the output end of the first waveguide and the input end of the fifth waveguide to each other, wherein an upper cladding of the ninth waveguide includes a first electrically conductive type semiconductor layer, and wherein an upper cladding of the first waveguide and an upper cladding of the fifth waveguide each include a second electrically conductive type semiconductor layer.

3. The optical modulator according to claim 1, wherein the optical coupler includes a first optical coupler optically coupled to the output end of the fifth waveguide and the output end of the sixth waveguide, a second optical coupler optically coupled to the output end of the seventh waveguide and the output end of the eighth waveguide, and a third optical coupler optically coupled to the first optical coupler and the second optical coupler.

4. A method of manufacturing an optical modulator, the method comprising:

preparing the optical modulator according to claim 1, in which the optical modulator further includes a third electrode connected to the first waveguide, a fourth electrode connected to the second waveguide, a fifth electrode connected to the third waveguide, and a sixth electrode connected to the fourth waveguide;

adjusting a voltage applied to the third electrode and a voltage applied to the fourth electrode;

adjusting a voltage applied to the fifth electrode and a voltage applied to the sixth electrode;

adjusting a voltage applied to the first electrode and a voltage applied to the second electrode based on a result of adjustment of the voltages applied to the third electrode, the fourth electrode, the fifth electrode, and the sixth electrode; and readjusting the voltages applied to the third electrode and the fourth electrode or the voltages applied to the fifth electrode and the sixth electrode based on a result of adjustment of the voltages applied to the first electrode and the second electrode.

* * * * *